United States Patent
Davis et al.

(10) Patent No.: US 10,605,167 B2
(45) Date of Patent: Mar. 31, 2020

(54) GAS TURBINE ENGINE FRONT CENTER BODY ARCHITECTURE

(71) Applicant: United Technologies Corporation, Hartford, CT (US)

(72) Inventors: Todd A. Davis, Tolland, CT (US); Brian P. Cigal, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1498 days.

(21) Appl. No.: 13/860,774

(22) Filed: Apr. 11, 2013

(65) Prior Publication Data
US 2014/0079546 A1   Mar. 20, 2014

Related U.S. Application Data

(63) Continuation of application No. 13/732,647, filed on Jan. 2, 2013, now Pat. No. 8,911,204, which is a
(Continued)

(51) Int. Cl.
*F02C 7/06* (2006.01)
*F01D 25/28* (2006.01)
(Continued)

(52) U.S. Cl.
CPC ............... *F02C 7/06* (2013.01); *F01D 15/12* (2013.01); *F01D 25/162* (2013.01);
(Continued)

(58) Field of Classification Search
CPC ...... F02C 7/06; F02C 7/20; F02C 7/36; F02K 3/06; Y10T 29/49245; F05D 2230/60;
(Continued)

(56) References Cited

U.S. PATENT DOCUMENTS 2,258,792 A   4/1941   New
2,936,655 A   5/1960   Peterson et al.
(Continued)

FOREIGN PATENT DOCUMENTS

EP   0791383   8/1997
EP   1114949   7/2001
(Continued)

OTHER PUBLICATIONS

Kandebo, S.W. (1993). Geared-turbofan engine design targets cost, complexity. Aviation Week & Space Technology, 148(8), p. 32.
(Continued)

*Primary Examiner* — Christopher Verdier
(74) *Attorney, Agent, or Firm* — Carlson, Gaskey & Olds, P.C.

(57) ABSTRACT

Disclosed is a gas turbine engine configured to include a propulsor section having a fan drive geared architecture. The gas turbine engine includes a gas generator section that includes a compressor section having a first rotor rotationally mounted to a first spool. The engine further includes a bearing package adapted for rotationally supporting the first spool. The bearing package is configured for supporting the first rotor during at least one of (1) a period prior to installation of the fan drive geared architecture into the engine and (2) a period after removal of the fan drive geared architecture from the engine.

13 Claims, 8 Drawing Sheets

Related U.S. Application Data continuation of application No. 13/282,919, filed on Oct. 27, 2011, now Pat. No. 8,366,385, which is a continuation-in-part of application No. 13/087,579, filed on Apr. 15, 2011, and a continuation-in-part of application No. 13/275,286, filed on Oct. 17, 2011, now abandoned.

(60) Provisional application No. 61/789,224, filed on Mar. 15, 2013.

(51) Int. Cl.
  F01D 25/16 (2006.01)
  F01D 15/12 (2006.01)
  F02K 3/06 (2006.01)
  F02C 7/20 (2006.01)
  F02C 7/36 (2006.01)

(52) U.S. Cl.
  CPC ............. *F01D 25/285* (2013.01); *F02C 7/20* (2013.01); *F02C 7/36* (2013.01); *F02K 3/06* (2013.01); *F05D 2230/60* (2013.01); *F05D 2230/70* (2013.01); *F05D 2230/72* (2013.01); *F05D 2230/80* (2013.01); *Y02T 50/671* (2013.01); *Y10T 29/49245* (2015.01)

(58) Field of Classification Search
  CPC ............. F05D 2230/72; F05D 2230/70; F05D 2230/80; F01D 15/12; F01D 25/16; F01D 25/162; F01D 25/285; B23P 6/002; B23P 6/005
  USPC ....... 415/189–190, 209.2–209.4, 214.1, 229, 415/230, 122.1, 124.1; 416/174, 244 A, 416/245 R, 170 R; 60/798; 29/889.1, 29/402.03, 426.1
  See application file for complete search history.

(56) References Cited

U.S. PATENT DOCUMENTS

| | | | |
|---|---|---|---|
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,747,343 A | 7/1973 | Rosen | |
| 3,754,484 A | 8/1973 | Roberts | |
| 3,820,719 A | 6/1974 | Clark | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,132,069 A | 1/1979 | Adamson et al. | |
| 4,478,551 A | 10/1984 | Honeycutt, Jr. et al. | |
| 4,649,114 A | 3/1987 | Miltenburger et al. | |
| 4,683,714 A | 8/1987 | Thebert | |
| 4,696,156 A | 9/1987 | Burr et al. | |
| 4,744,214 A | 5/1988 | Monsarrat et al. | |
| 4,979,362 A | 12/1990 | Vershure, Jr. | |
| 5,102,379 A | 4/1992 | Pagluica et al. | |
| 5,141,400 A | 8/1992 | Murphy et al. | |
| 5,317,877 A | 6/1994 | Stuart | |
| 5,433,584 A | 7/1995 | Amin et al. | |
| 5,433,674 A | 7/1995 | Sheridan et al. | |
| 5,447,411 A | 9/1995 | Curley et al. | |
| 5,466,198 A | 11/1995 | McKibbin et al. | |
| 5,524,847 A | 6/1996 | Brodell et al. | |
| 5,622,438 A | 4/1997 | Walsh et al. | |
| 5,677,060 A | 10/1997 | Terentieva et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,814,541 B2 | 11/2004 | Evans et al. | |
| 7,021,042 B2 | 4/2006 | Law | |
| 7,328,580 B2 | 2/2008 | Lee et al. | |
| 7,374,403 B2 | 5/2008 | Decker et al. | |
| 7,591,754 B2 | 9/2009 | Duong et al. | |
| 7,765,787 B2 | 8/2010 | Eleftheriou et al. | |
| 7,797,922 B2 | 9/2010 | Eleftheriou et al. | |
| 7,806,651 B2 | 10/2010 | Kennepohl et al. | |
| 7,824,305 B2 | 11/2010 | Duong et al. | |
| 7,926,260 B2 | 4/2011 | Sheridan et al. | |
| 7,997,868 B1 | 8/2011 | Liang et al. | |
| 8,205,432 B2 | 6/2012 | Sheridan | |
| 8,241,172 B2 | 8/2012 | Lahtinen et al. | |
| 8,585,538 B2 | 11/2013 | Sheridan et al. | |
| 2002/0067870 A1 | 6/2002 | Ommundson et al. | |
| 2006/0130456 A1 | 6/2006 | Suciu et al. | |
| 2007/0022738 A1 | 2/2007 | Norris et al. | |
| 2008/0003096 A1 | 1/2008 | Kohli et al. | |
| 2008/0006018 A1 | 1/2008 | Sheridan et al. | |
| 2008/0014084 A1 | 1/2008 | Eleftheriou et al. | |
| 2008/0098713 A1 | 5/2008 | Orlando et al. | |
| 2008/0317588 A1 | 12/2008 | Grabowski et al. | |
| 2009/0056343 A1 | 3/2009 | Suciu et al. | |
| 2009/0081039 A1 | 3/2009 | McCune et al. | |
| 2010/0105516 A1 | 4/2010 | Sheridan et al. | |
| 2010/0132369 A1 | 6/2010 | Durocher et al. | |
| 2010/0148396 A1 | 6/2010 | Xie et al. | |
| 2010/0150702 A1 | 6/2010 | Sheridan et al. | |
| 2010/0218483 A1 | 9/2010 | Smith | |
| 2010/0331139 A1 | 12/2010 | McCune | |
| 2011/0130246 A1 | 6/2011 | McCune et al. | |
| 2011/0159797 A1 | 6/2011 | Beltman et al. | |
| 2011/0286836 A1 | 11/2011 | Davis | |
| 2011/0293423 A1 | 12/2011 | Bunker et al. | |
| 2012/0124964 A1 | 5/2012 | Hasel et al. | |
| 2012/0260669 A1 | 10/2012 | Davis et al. | |
| 2012/0263578 A1 | 10/2012 | Davis et al. | |

FOREIGN PATENT DOCUMENTS

| | | |
|---|---|---|
| EP | 1142850 | 10/2001 |
| EP | 1890054 | 5/2010 |
| EP | 2390472 A2 | 11/2011 |
| EP | 2511484 | 10/2012 |
| EP | 1876338 B1 | 10/2013 |
| GB | 1516041 | 6/1978 |
| GB | 2041090 | 9/1980 |
| GB | 2320527 | 6/1998 |
| GB | 2426792 | 12/2006 |
| WO | 2007038674 | 4/2007 |

OTHER PUBLICATIONS

European Search Report and Written Opinion for European Application No. EP 12 16 4348 completed on Nov. 6, 2013.

Extended European Search Report for European Application No. 12188417.5 dated Oct. 21, 2016.

Brines, G.L. (1990). The turbofan of tomorrow. Mechanical Engineering: The Journal of the American Society of Mechanical Engineers, 108(8), 65-67.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

(56) References Cited

OTHER PUBLICATIONS

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Ramsden, J.M. (Ed). (1978). The new European airliner. Flight International, 113(3590). Jan. 7, 1978.

Lau, K., Gu, C., and Hui, D. (2005). A critical review on nanotube and nanotube/nanoclay related polymer composite materials. Composites: Part B 37(2006)425-436.

Shorter Oxford English dictionary, 6th Edition. (2007). vol. 2, N-Z. p. 1888.

Sweetman, B. and Sutton, O. (1998). Pratt & Whitney's surprise leap. Interavia Business & Technology, 53.621, p. 25

Merriam-Webster's collegiate dictionary, 11th Ed. (2009). p. 824.

Merriam-Webster's collegiate dictionary, 10th Ed. (2001). p. 1125-1126

Whitaker, R. (1982). ALF 502: plugging the turbofan gap. Flight International, p. 237-241, Jan. 30, 1982.

File History for U.S. Appl. No. 12/131,876.

Third Party Observations filed in EP Application No. 12164348.0 on Mar. 27, 2015.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. Jun. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437. The year of the publication is sufficiently earlier than the effective U.S. or foreign priority date so that the particular month of the publication is not an issue.

Carney, K., Pereira, M. Revilock, and Matheny, P. (2003). Jet engine fan blade containment using two alternate geometries. 4th European LS-DYNA Users Conference. pp. 1-10. The year of the publication is sufficiently earlier than the effective U.S. or foreign priority date so that the particular month of the publication is not an issue.

"Civil Turbojet/Turbofan Specifications", Jet Engine Specification Database (Apr. 3, 2005), pp. 1-8.

Faghri, A. (Mar. 1995). Heat pipe and science technology. Washington, D.C.: Taylor & Francis. pp. 1-60.

Hess, C. (1998). Pratt & Whitney develops geared turbofan. Flug Revue 43(7). Oct. 1998. pp. 1-19 of English translation.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). Sep. 2007. pp. 1-38.

Griffiths, B. (May 2005). Composite fan blade containment case. Modern Machine Shop. Retrieved from: http://www.mmsonline.com/articles/composite-fan-blade-containment-case pp. 1-4.

Hendricks, E.S. and Tong, M.T. (Sep. 2012). Performance and weight estimates for an advanced open rotor engine. NASA/TM-2012-217710. pp. 1-13.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (Jan. 2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11. The year of the publication is sufficiently earlier than the effective U.S. or foreign priority date so that the particular month of the publication is not an issue.

Xie, M. (May 2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (Aug. 1979). Quiet clean short-haul experimental engine (QCSEE) final report. NASA/CR-159473 pp. 1-289.

Kollar, L.P. and Springer, G.S. (Apr. 2003). Mechanics of composite structures. Cambridge, UK: Cambridge University Press. p. 465.

Langstron, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (Dec. 1989). Aircraft propulsion systems and technology and design. Washington, D.C.: American Institute of Aeronautics, Inc. pp. 341-344.

Lynwader, P. (1983). Gear drive systems: Design and application. New York, New York: Marcel Dekker, Inc. pp. 145, 355-358. The year of the publication is sufficiently earlier than the effective U.S. or foreign priority date so that the particular month of the publication is not an issue.

Mattingly, J.D. (Mar. 1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber, pp. 1-5.

Nanocor Technical Data for Epoxy Nanocomposites using Nanomer 1.30E Nanoclay. Nnacor, Inc. Oct. 2004, pp. 1-4.

Ratna, D. (2009). Handbook of thermoset resins. Shawbury, UK: iSmithers. pp. 187-216. The year of the publication is sufficiently earlier than the effective U.S. or foreign priority date so that the particular month of the publication is not an issue.

Wendus, B.E., Stark, D.F., Holler, R.P., and Funkhouser, M.E. (Aug. 2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Hughes, C. (2010). Geared turbofan technology. NASA Environmentally Responsible Aviation Project. Green Aviation Summit. NASA Ames Research Center. Sep. 8-9, 2010. pp. 1-8.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (Apr. 2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012, pp. 1-11.

Ivchenko-Progress AI-727M. Jane's Aero-engines, Aero-engines—Turbofan. Nov. 27, 2011, pp. 1-4.

Ivchenko-Progress D-727. Jane's Aero-engines, Aero-engines—Turbofan. Feb. 7, 2007, pp. 1-2.

Turbomeca Aubisque. Jane's Aero-engines, Aero-engines—Turbofan. Nov. 2, 2009, pp. 1-4.

Aviadvigatel D-110. Jane's Aero-engines, Aero-engines—Turbofan. Jun. 1, 2010, pp. 1-4.

Rolls-Royce M45H. Jane's Aero-engines, Aero-engines—Turbofan. Feb. 24, 2010, pp. 1-4.

Honeywell LF502. Jane's Aero-engines, Aero-engines—Turbofan. Feb. 9, 2012, pp. 1-6.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

(56) References Cited

OTHER PUBLICATIONS

Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 50-52, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Appl. No. 8,844,265. Executed Jun. 28, 2016. pp. 1-91.
Declaration of John Eaton, Ph.D. In re United States Patent Application 8,869,568. Executed Mar. 28, 2016. pp. 1-87.
Declaration of Reza Abhari. In re U.S. Appl. No. 8,695,920. Executed Nov. 30. pp. 1-67.
Declaration of Reza Abhari. In re U.S. Appl. No. 8,448,895. Executed Nov. 28. pp. 1-81.
Declaration of Reza Abhari. In re U.S. Appl. No. 8,695,920, claims 1-4, 7-14, 17 and 19. Executed Nov. 29. pp. 1-102.
Declaration of Dr. Magdy Attia. In re U.S. Appl. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Appl. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.

(56) References Cited

OTHER PUBLICATIONS

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Baker, R.W. (2000). Membrane technology and applications. New York, NY: McGraw-Hill. pp. 87-153.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

GAS TURBINE ENGINE FRONT CENTER BODY ARCHITECTURE

CROSS REFERENCE TO RELATED APPLICATIONS

The present disclosure claims the benefit of U.S. Provisional Application No. 61/789,224, filed Mar. 15, 2013. Further, the present disclosure is a continuation of U.S. Pat. No. 8,911,204 granted Dec. 1, 2014, which is a continuation of U.S. patent application Ser. No. 13/282,919, filed on Oct. 27, 2011, which is now U.S. Pat. No. 8,366,385 granted Feb. 5, 2013, which is a continuation-in-part application of U.S. patent application Ser. No. 13/087,579, filed 15 Apr. 2011, and of U.S. patent application Ser. No. 13/275,286, filed 17 Oct. 2011, which is now abandoned.

BACKGROUND

The present disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure which is typically constructed of modules with individual case sections which are joined together at bolted flanges. The flanges form a joint capable of withstanding the variety of loads transmitted through the engine static structure. An ongoing issue for gas turbine engines is the ease and speed at which they can be serviced.

SUMMARY

In one exemplary embodiment, a method for servicing a gas turbine engine includes disassembling a bearing compartment, providing access from a forward side of the gas turbine engine to a gearbox contained within said bearing compartment. The gas turbine engine provides a core flow path that extends from the forward side aftward in a core flow direction. The method includes servicing a component located within the bearing compartment.

In a further embodiment of any of the above, disassembling the bearing compartment includes disassembling a front wall from a front center body support.

In a further embodiment of any of the above, the method includes providing access from the forward side to a flex support mounted within the front center body support. The flex support is mounted to the gearbox.

In a further embodiment of any of the above, the method includes disassembling a bearing package from the front center body support.

In a further embodiment of any of the above, the method includes disassembling the front wall from an output shaft driven by the gearbox.

In a further embodiment of any of the above, the step of disassembling includes removing as a module the gearbox by displacing the gearbox forward and away from said bearing compartment and a low spool.

In a further embodiment of any of the above, the component servicing step includes servicing one of the gearbox, a bearing package and a seal package.

In another exemplary embodiment, a method for servicing a gas turbine engine includes providing access from a forward side of a front center body assembly to a gearbox driven by a low spool, and servicing a component located within a bearing compartment aft of the front center body assembly.

In a further embodiment of any of the above, the method includes disassembling a fan mounted to the gearbox.

In a further embodiment of any of the above, the method includes removing first fasteners located within the forward side of the front center body assembly to disassemble a front wall from a front center body support of the front center body assembly.

In a further embodiment of any of the above, the disassembling step includes removing a fan hub from an output shaft coupled to the gearbox. The fasteners removing step is performed subsequent to the fan hub removing step.

In a further embodiment of any of the above, the forward side faces a fan.

In a further embodiment of any of the above, the access providing step includes removing as a module the gearbox by displacing the gearbox forward and away from said bearing compartment and said low spool thereby exposing the component. The component servicing step includes servicing one of a bearing package and a seal package.

In another exemplary embodiment, a gas turbine engine includes a gearbox defined along an engine axis. A low spool is arranged aft of the gearbox and is operable to drive said gearbox. A front center body support is defined around the engine axis. A bearing package is mounted to the front center body support and the low spool. A seal package is located aft of the bearing package. A front wall is mounted to the front center body support. The front wall is removable from the front center body support to access at least one of the gearbox, the bearing package and the seal package.

In a further embodiment of any of the above, the front center body support is defined about an engine longitudinal axis.

In a further embodiment of any of the above, the seal package is mounted to the front center body support.

In a further embodiment of any of the above, the front center body support includes a flange which abuts a flange of the front wall.

In a further embodiment of any of the above, the gas turbine engine includes fasteners, which attach the flange of the front wall to the flange of the front center body support.

In a further embodiment of any of the above, the fasteners are accessible from a forward side of the gas turbine engine.

In a further embodiment of any of the above, the front wall supports a bearing structure to support an output shaft driven by the gearbox. The output shaft is operable to drive a fan.

In a further embodiment of any of the above, the gearbox drives a fan section at a speed different than a speed of the low speed spool.

In a further embodiment of any of the above, the front center body support provides a unitary component with a front center body section having a vane arranged in an annular core path and that at least partially defines a core flow path.

In a further embodiment of any of the above, the front center body support and the front center body section are integral with one another.

In a further embodiment of any of the above, the front center body support and the front center body section are welded to one another.

In a further embodiment of any of the above, the gas turbine engine includes a coupling shaft interconnecting and splined to each of the gearbox and the coupling shaft section.

In a further embodiment of any of the above, the low spool includes a low pressure compressor hub providing a spline engageable with the bearing package. The seal package is mounted to the low pressure compressor hub.

In one exemplary embodiment, a gas turbine engine is configured to include a propulsor section having a fan drive geared architecture. The engine includes a gas generator section that includes a compressor section having a first rotor rotationally mounted to a first spool. Further included is a bearing package rotationally supporting the first spool. The bearing package supports the first spool during at least one of (1) a period prior to installation of the fan drive geared architecture into the engine and (2) a period after removal of the fan drive geared architecture from the engine.

In a further embodiment of any of the above, the first spool is a low spool of the engine.

In a further embodiment of any of the above, the fan drive geared architecture drives a fan section at a speed different than a speed of the low spool.

In a further embodiment of any of the above, a front center body support is defined around an engine longitudinal axis.

In a further embodiment of any of the above, the bearing package is mounted to the front center body support and the low spool.

In a further embodiment of any of the above, an engine static structure is included.

In a further embodiment of any of the above, the bearing package is adapted for rotationally supporting the first spool against the static structure.

Another exemplary embodiment includes a method of supporting a first rotor of a gas turbine engine. The engine is configured to include a propulsor section having a fan drive geared architecture. The engine further includes a gas generator section that includes a compressor section having a first rotor rotationally mounted to a first spool, an engine static structure, and a bearing package adapted for rotationally supporting the first spool against the engine static structure. The method includes supporting the first rotor with the bearing package during at least one of (1) a period prior to installation of the fan drive geared architecture into the engine and (2) a period after removal of the fan drive geared architecture from the engine.

In a further embodiment of any of the above, the compressor section includes a low pressure compressor.

In a further embodiment of any of the above, the bearing package supports the first rotor during each of (1) before the fan drive geared architecture into the engine and (2) after the fan drive geared architecture is removed from the engine.

In a further embodiment of any of the above, the fan drive geared architecture includes a gearbox.

In a further embodiment of any of the above, the bearing package supports a low rotor of the engine.

In a further embodiment of any of the above, the geared architecture is serviced while removed from the engine.

Another exemplary embodiment a method of partially disassembling a gas turbine engine. The engine includes a propulsor section having a fan drive geared architecture, a gas generator section that includes a compressor section having a first rotor rotationally mounted to a first spool, an engine static structure, and a bearing package adapted for rotationally supporting the first spool relative to the static structure. The method includes removing the propulsor section without otherwise supporting the first rotor, whereby the bearing package disposed within the engine supports the first rotor.

In a further embodiment of any of the above, the compressor section includes is a low pressure compressor.

In a further embodiment of any of the above, the bearing package is provided in a bearing compartment of the engine.

In a further embodiment of any of the above, the geared architecture includes a gearbox.

In a further embodiment of any of the above, the first rotor is the low rotor of the engine.

In a further embodiment of any of the above, the geared architecture is serviced while removed from the engine.

In a further embodiment of any of the above, the bearing package is adapted for rotationally supporting the first spool against the static structure.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
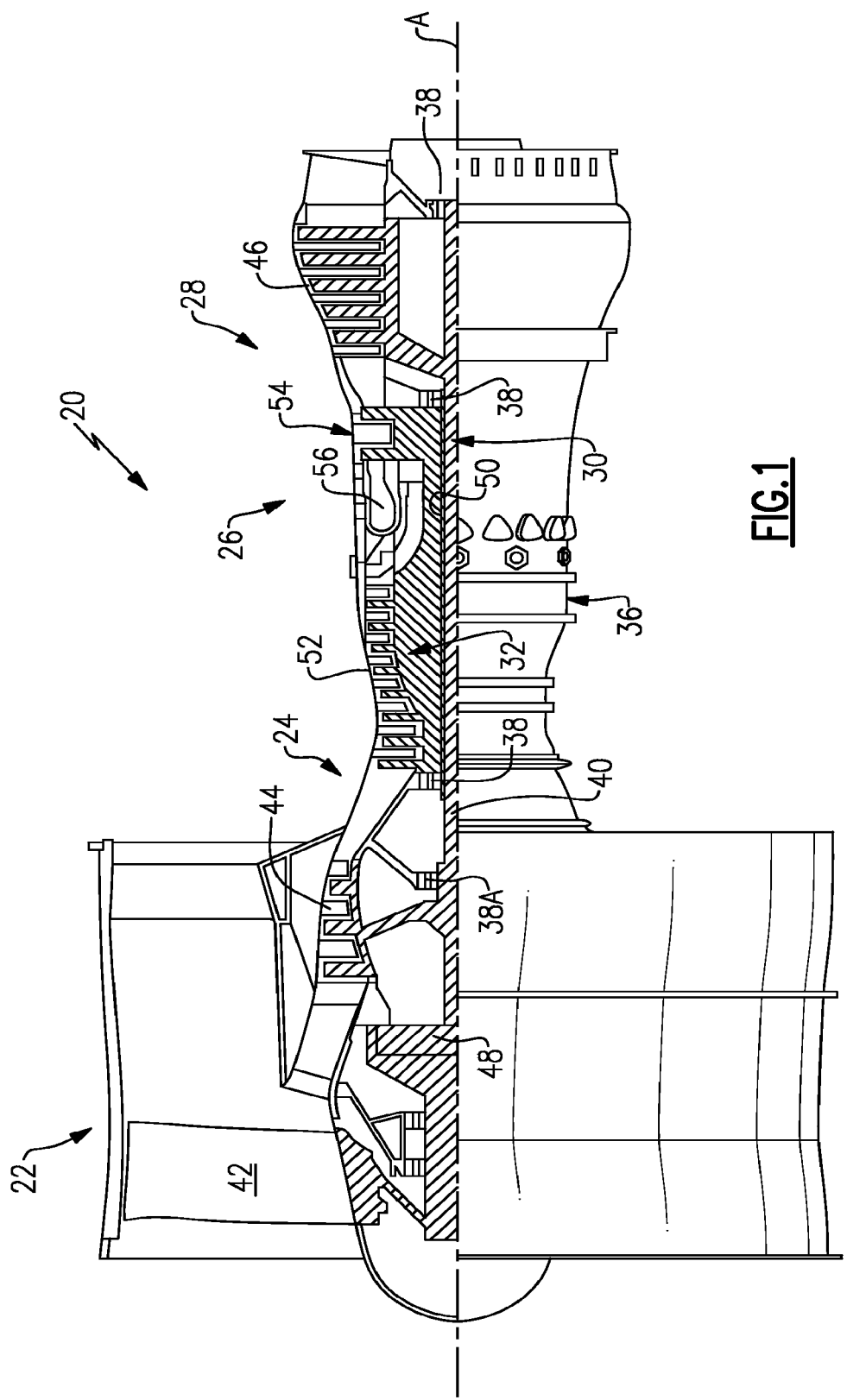
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a propulsor section that includes a fan section 22, and a gas generator section that includes a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low spool 30 and a high spool 32 mounted for rotation about an engine central longitudinal axis A relative to an engine static structure 36 via several bearing supports 38. The low spool 30 generally includes an inner shaft 40 that interconnects a fan 42, a low pressure compressor 44 and a low pressure turbine 46. The inner shaft 40 drives the fan 42 through a geared architecture 48 to drive the fan 42 at a lower speed than the low spool 30. For purposes of relating to the disclosed embodiments, the geared architecture is considered part of the propulsor section. The high spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40, 50 are supported at a plurality of points by the bearing system 38 within the static structure 36. In one non-limiting embodiment, bearing system 38 includes a #2 bearing support 38A located within the compressor section 24.

Figure 2:
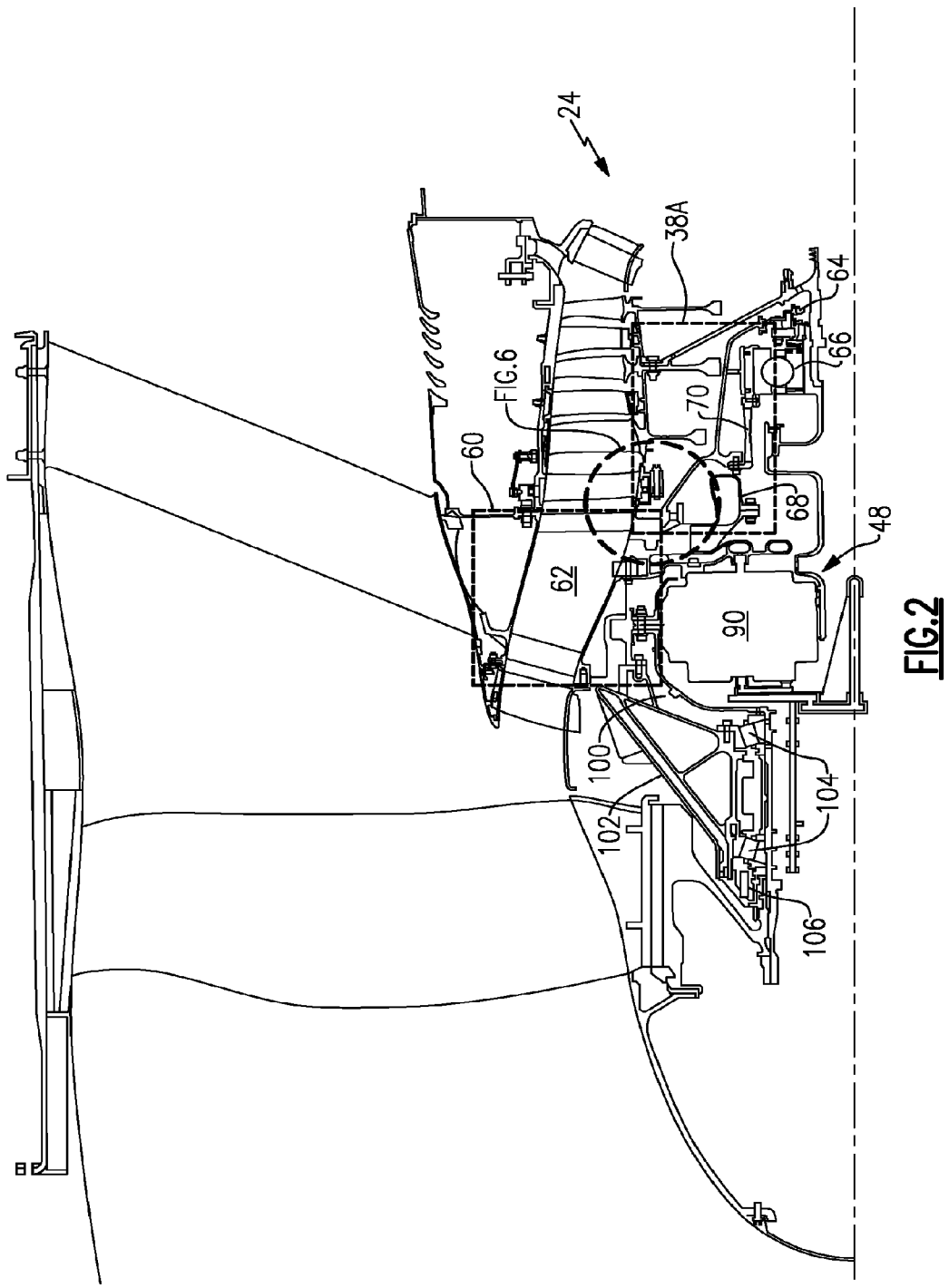
FIG. 2 is an enlarged cross-section of a portion of the gas turbine engine which illustrates a front center body assembly.

With reference to FIG. 2, the engine static structure 36 proximate the compressor section 24 includes a front center body assembly 60 adjacent a #2 bearing support 38A. The front center body assembly 60 generally includes a front center body support 62. The #2 bearing support 38A generally includes a seal package 64, a bearing package 66, a flex support 68 and a centering spring 70.

Figure 3:
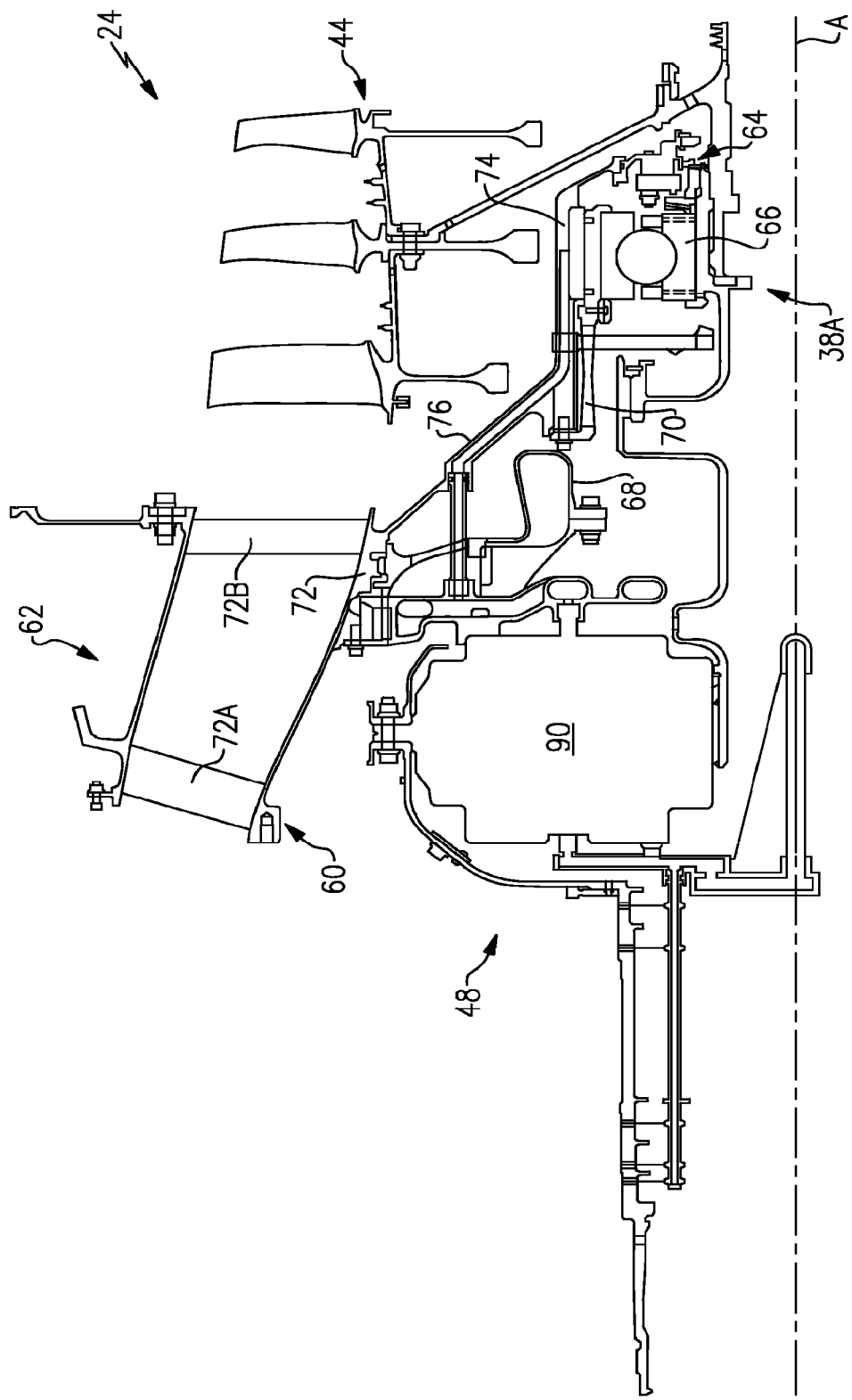
FIG. 3 is an enlarged cross-section of the geared architecture of the gas turbine engine.
Figure 4:
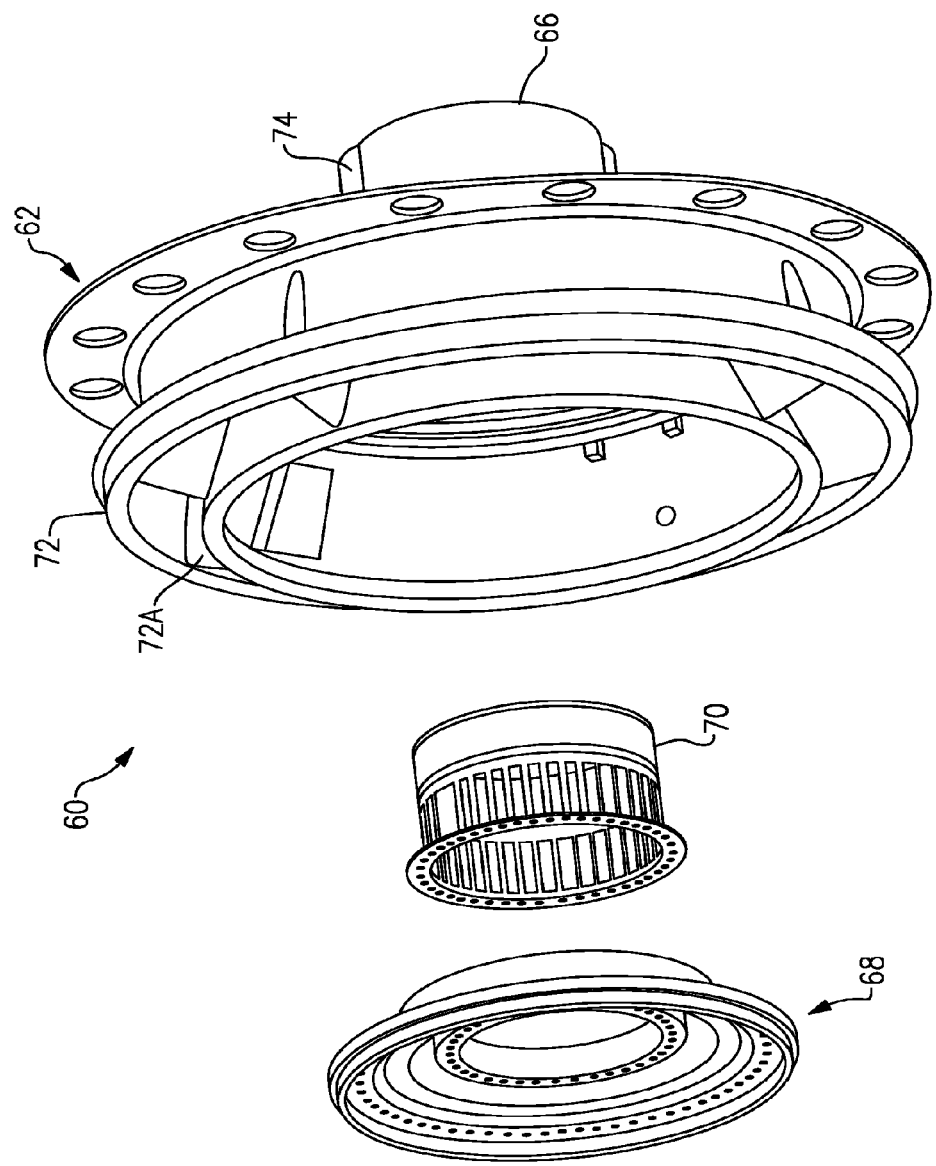
FIG. 4 is an exploded perspective view of a front center body assembly.

With reference to FIG. 3, the flex support 68 provides a flexible attachment of the geared architecture 48 within the front center body support 62 (also illustrated in FIG. 4). The flex support 68 reacts the torsional loads from the geared architecture 48 and facilitates vibration absorption as well as other support functions. The centering spring 70 is a generally cylindrical cage-like structural component with a multiple of beams which extend between flange end structures (also illustrated in FIG. 4). The centering spring 70 resiliently positions the bearing package 66 with respect to the low spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

Figure 5:
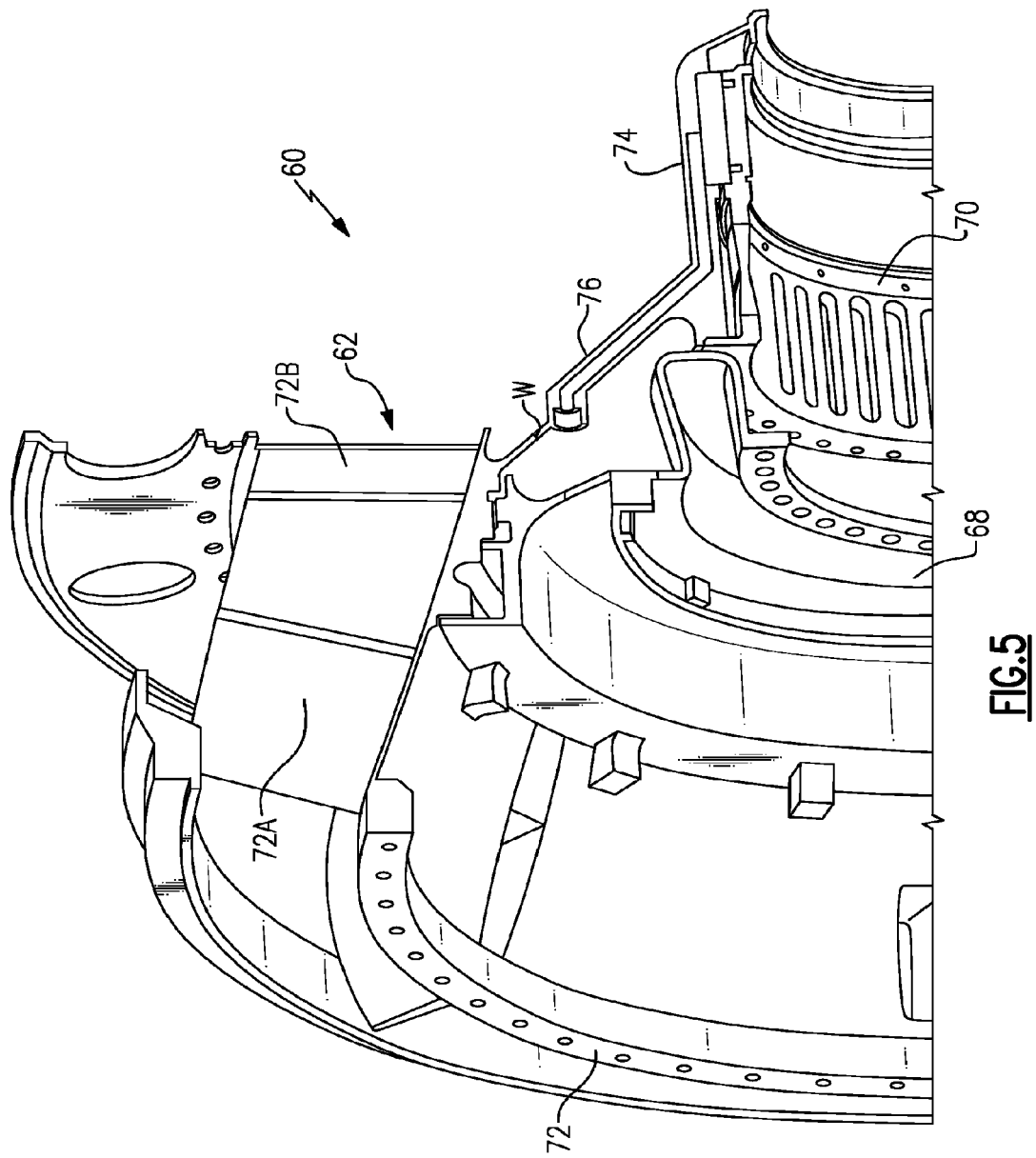
FIG. 5 is an enlarged perspective partial cross-section of a front center body support of the front center body assembly.

The front center body support 62 includes a front center body section 72 and a bearing section 74 defined about axis A with a frustro-conical interface section 76 therebetween (FIG. 5). The front center body section 72 at least partially defines the core flowpath into the low pressure compressor 44. The front center body section 72 includes an annular core passage with a multiple of front center body vanes 72A, 72B. The bearing section 74 is defined radially inward of the front center body section 72. The bearing section 74 locates the bearing package 66 and the seal package 64 with respect to the low spool 30. The frustro-conical interface section 76 combines the front center body section 72 and the bearing section 74 to form a unified load path, substantially free of kinks typical of a conventional flange joint, from the bearing package 66 to the outer periphery of the engine static structure 36. The frustro-conical interface section 76 may include a weld W (FIG. 5) or, alternatively, be an integral section such that the front center body support 62 is a unitary component.

The integral, flange-less arrangement of the frustro-conical interface section 76 facilitates a light weight, reduced part count architecture with an increased ability to tune the overall stiffness and achieve rotor dynamic requirements. Such an architecture also further integrates functions such as oil and air delivery within the bearing compartment which surrounds bearing package 66.

Figure 6:
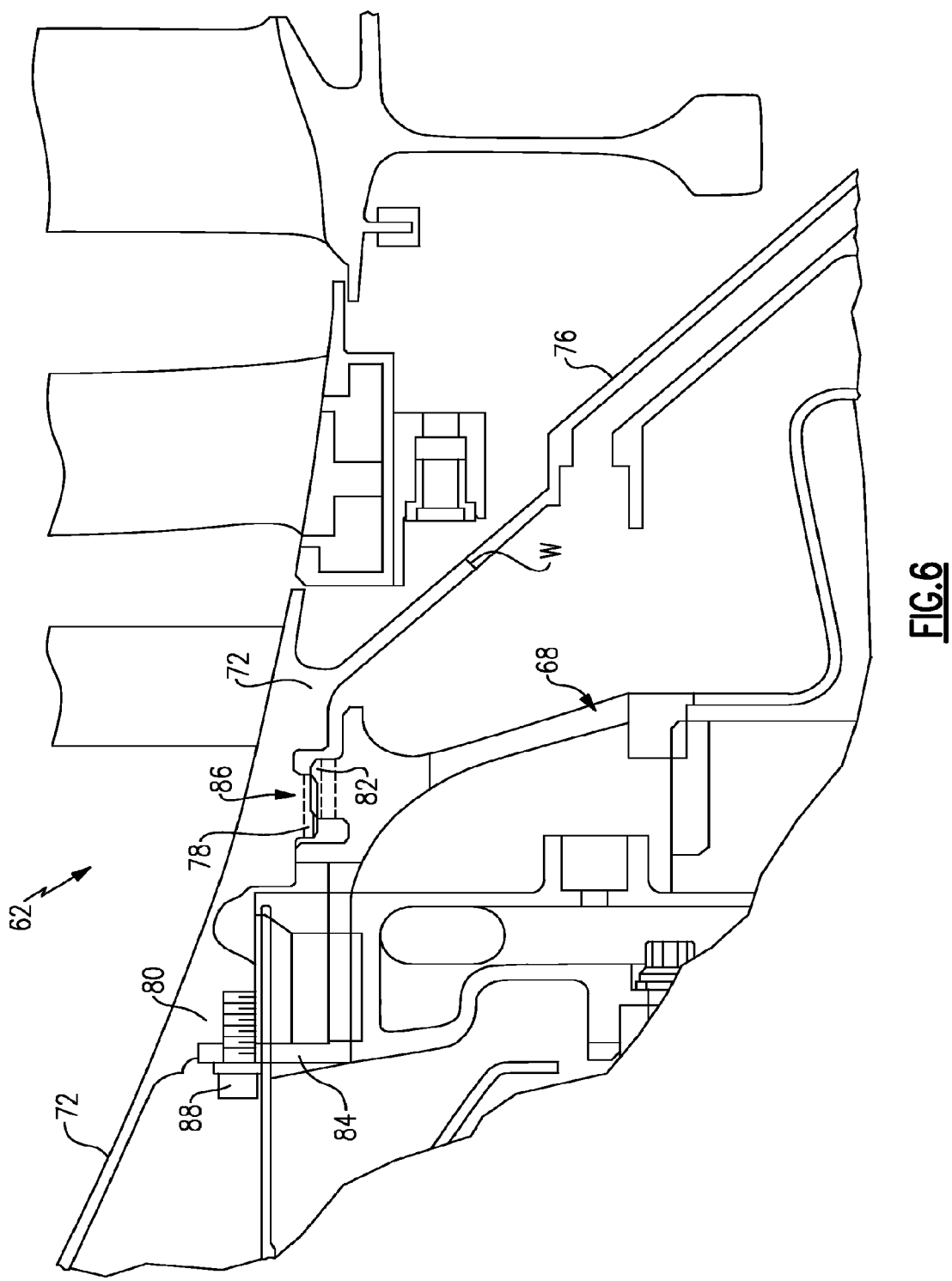
FIG. 6 is an enlarged sectional view of the front center body support.

With reference to FIG. 6, the front center body support 62 includes mount features to receive the flex support 68. In one disclosed non-limiting embodiment, the mount features of the front center body support 62 includes an internal spline 78 and a radial inward directed fastener flange 80 on the front center body section 72. The flex support 68 includes a corresponding outer spline 82 and radially outwardly directed fastener flange 84. The flex support 68 is received into the front center body support 62 at a splined interface 86 formed by splines 78, 82 and retained therein such that fastener flange 84 abuts fastener flange 80. A set of fasteners 88 such as bolts are threaded into the fastener flanges 80, 84 to mount the flex support 68 within the front center body support 62.

Figure 7:
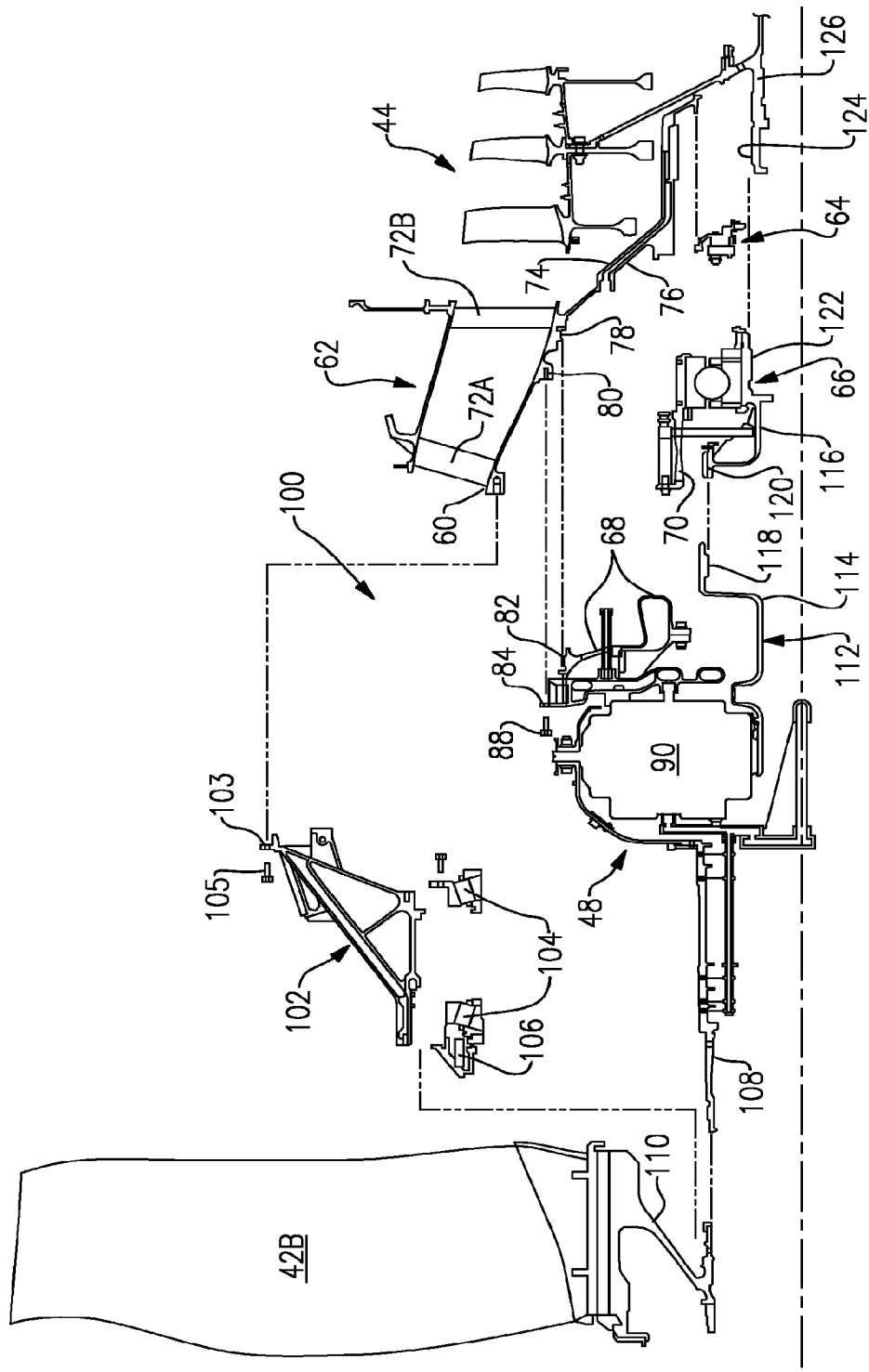
FIG. 7 is an exploded view of the front center body support.

With reference to FIG. 7, the fasteners 88 are directed forward to provide access from a forward section of the front center body assembly 60 opposite the bearing package 66 of the number two bearing system 38A. The fasteners 88 are thereby readily removed to access a gearbox 90 of the geared architecture 48.

A front wall 102 aft of the fan 42 is mounted to a forward section of the front center body support 62 to provide access to the geared architecture 48 from the front of the engine 20. The front wall 102 includes a flange 103 mountable to the front center body support 62 at the flange 60 by a multiple of fasteners 105, which fasteners 105 may in one non-limiting embodiment be bolts. The front wall 102 and the front center body support 62 define a bearing compartment 100 (also shown in FIG. 2) which mounts to the bearing package 66. The front wall 102 is removable such that the gearbox 90 may be accessed as a module. The gearbox 90 may thereby be accessed to facilitate rapid on-wing service.

It should be appreciated that various bearing structures 104 (illustrated schematically and in FIG. 2) and seals 106 (illustrated schematically and in FIG. 2) may be supported by the front wall 102 to contain oil and support rotation of an output shaft 108. The output shaft 108 connects with the geared architecture 48 to drive the fan 42. Fan blades 42B extend from a fan hub 110 which are mounted to the output shaft 108 for rotation therewith. It should be appreciated that the bearing structures 104 and seals 106 may, in the disclosed non-limiting embodiment may be disassembled with the front wall 102 as a unit after removal of the fan hub 110.

The gearbox 90 is driven by the low spool 30 (FIG. 1) through a coupling shaft 112. The coupling shaft 112 transfers torque through the bearing package 66 to the gearbox 90 as well as facilitates the segregation of vibrations and other transients. The coupling shaft 112 generally includes a forward coupling shaft section 114 and an aft coupling shaft section 116 which extends from the bearing package 66. The forward coupling shaft section 114 includes an interface spline 118 which mates with an aft spline 120 of the aft coupling shaft section 116. An interface spline 122 of the aft coupling shaft section 116 connects the coupling shaft 112 to the low spool 30 through, in this non limiting embodiment, splined engagement with a spline 124 on a low pressure compressor hub 126 of the low pressure compressor 44.

Figure 8:
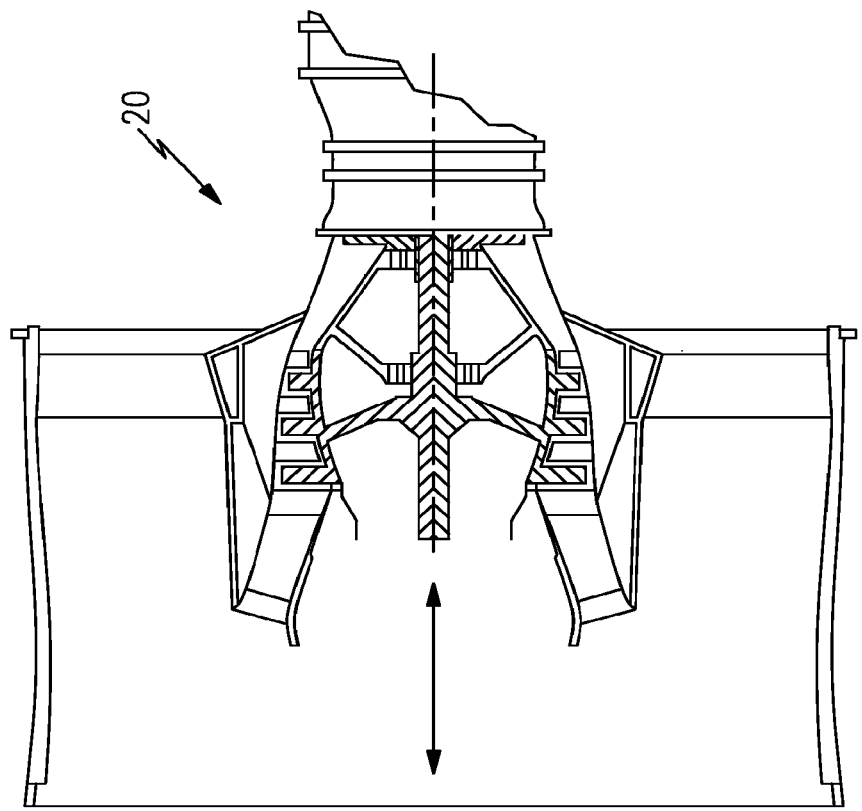
FIG. 8 is a schematic view of a forward gearbox removal from the gas turbine engine.
Figure 8:
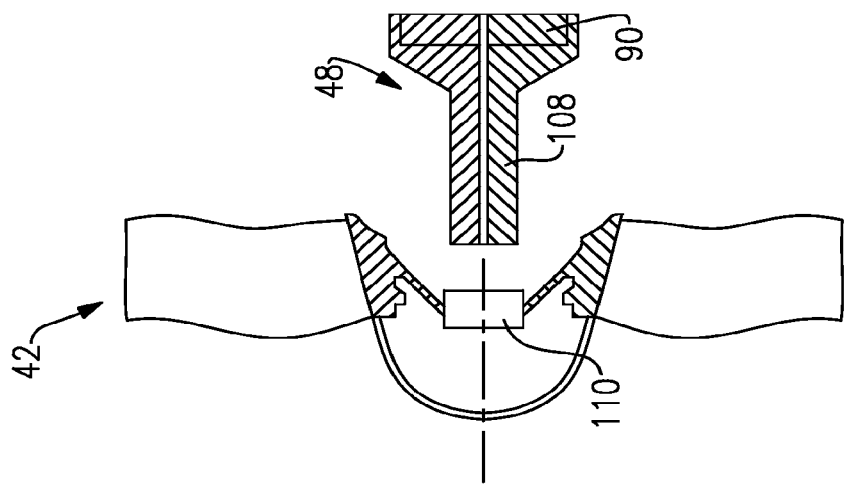

To remove the gearbox 90, the fan hub 110 is disassembled from the output shaft 108. The multiple of fasteners 105 are then removed such that the front wall 102 is disconnected from the front center body support 62. The multiple of fasteners 88 are then removed from the front of the engine 20. The geared architecture 48 is then slid forward out of the front center body support 62 such that the interface spline 118 is slid off the aft spline 120 and the outer spline 82 is slid off the internal spline 78. The geared architecture 48 is thereby removable from the engine 20 as a module (FIG. 8; illustrated schematically). It should be appreciated that other componentry may need to be disassembled to remove the geared architecture 48 from the engine 20, however, such disassembly is relatively minor and need not be discussed in detail. It should be further appreciated that other components such as the bearing package 66 and seal 64 are also now readily accessible from the front of the engine 20.

Removal of the gearbox 90 from the front of the engine 20 as disclosed saves significant time and expense. The geared architecture 48, is removable from the engine 20 as a module and does not need to be further disassembled. Moreover, although the geared architecture 48 must be removed from the engine to gain access to the bearing package 66 and the seal 64, the geared architecture 48 does not need to be removed from the engine 20 to gain access to the engine core itself. Further, as one would appreciate from the above, in an example where a portion of the geared architecture 48 itself requires service, the bearing package 66 can remain in place to support the low spool 30, and in turn a low rotor, of the gas turbine engine 20 while the geared architecture 48 is removed for service.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above described embodiments are exemplary and non-limiting. That is, modifications of this disclosure would come within the scope of the claims. Accordingly, the following claims should be studied to determine their true scope and content.

What is claimed is:

1. A gas turbine engine configured to include a propulsor section having a fan drive geared architecture, the engine including:
    a gas generator section that includes a compressor section having a first rotor rotationally mounted to a first spool;
    a bearing package rotationally supporting the first spool, wherein the bearing package is removable from the first spool without disassembly of the first rotor; and
    wherein the bearing package supports the first spool during at least one of (1) a period prior to installation of the fan drive geared architecture into the engine and (2) a period after removal of the fan drive geared architecture from the engine.

2. The gas turbine engine as recited in claim 1, wherein the first spool is a low spool of the engine.

3. The gas turbine engine as recited in claim 2, wherein the fan drive geared architecture drives a fan section at a speed different than a speed of the low spool.

4. The gas turbine engine as recited in claim 2, including a front center body support defined around an engine longitudinal axis.

5. The gas turbine engine as recited in claim 4, wherein the bearing package is mounted to the front center body support and the low spool.

6. The gas turbine engine as recited in claim 1, further including an engine static structure.

7. The gas turbine engine as recited in claim 6, wherein the bearing package is adapted for rotationally supporting the first spool against the static structure.

8. A method of supporting a first rotor of a gas turbine engine, the engine configured to include a propulsor section having a fan drive geared architecture, the engine including a gas generator section that includes a compressor section having the first rotor rotationally mounted to a first spool, an engine static structure, and a bearing package adapted for rotationally supporting the first spool against the engine static structure, wherein the bearing package is removable from the first spool without disassembly of the first rotor, the method comprising:
    supporting the first rotor with the bearing package during at least one of (1) a period prior to installation of the fan drive geared architecture into the engine and (2) a period after removal of the fan drive geared architecture from the engine.

9. The method of claim 8, wherein the compressor section includes a low pressure compressor.

10. The method as recited in claim 8, wherein the bearing package supports the first rotor during each of (1) before the fan drive geared architecture is installed into the engine and (2) after the fan drive geared architecture is removed from the engine.

11. The method as recited in claim 8, wherein the fan drive geared architecture includes a gearbox.

12. The method as recited in claim 8, wherein the bearing package supports a low rotor of the engine.

13. The method as recited in claim 8, further including, while the geared architecture is removed, servicing the geared architecture.

* * * * *